(12) United States Patent
Xue et al.

(10) Patent No.: US 10,500,649 B2
(45) Date of Patent: Dec. 10, 2019

(54) WHEEL CLAMP

(71) Applicant: CITIC Dicastal CO., LTD., Qinhuangdao, Hebei (CN)

(72) Inventors: Bowen Xue, Qinhuangdao (CN); Jiandong Guo, Qinhuangdao (CN); Yongwang Zhao, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 0 days.

(21) Appl. No.: 15/622,471

(22) Filed: Jun. 14, 2017

(65) Prior Publication Data
US 2018/0200805 A1 Jul. 19, 2018

(30) Foreign Application Priority Data
Jan. 18, 2017 (CN) .......................... 2017 1 0035290

(51) Int. Cl.
*B23B 31/16* (2006.01)
*B23B 41/00* (2006.01)
(Continued)

(52) U.S. Cl.
CPC .............. *B23B 31/16* (2013.01); *B23B 41/00* (2013.01); *B23Q 3/062* (2013.01); *B23B 31/302* (2013.01);
(Continued)

(58) Field of Classification Search
CPC ... B23B 31/16; B23B 31/302; B23B 2215/08; B23B 2270/025; B23B 41/00; B23Q 3/062; Y10T 279/10; Y10T 279/19; Y10T 279/29; Y10T 279/3487; Y10T 279/1274; Y10T 279/1283; Y10T 279/1291
See application file for complete search history.

(56) References Cited

U.S. PATENT DOCUMENTS 5,848,795 A * 12/1998 Masatsugu .......... B23B 31/1261
279/137
6,502,834 B1   1/2003 Fukui
(Continued)

FOREIGN PATENT DOCUMENTS

CN        2638915 Y     9/2004
CN      102218668 A    10/2011
(Continued)

OTHER PUBLICATIONS

Machine Trranslation, China Patent Document, CN 102218668, Zhang et al., Oct. 19, 2011.*

*Primary Examiner* — Eric A Gates
*Assistant Examiner* — Chwen-Wei Su
(74) *Attorney, Agent, or Firm* — Cooper Legal Group, LLC

(57) ABSTRACT

When a wheel clamp is used, width of a wheel is detected first, a first servo motor drives a lead screw to rotate, a supporting block and a lifting plate are automatically adjusted to appropriate heights via a nut, a manipulator puts the wheel onto end face blocks, air-tight devices are pressed down, an oil cylinder drives a chuck so that clamping jaws expand the central hole of the wheel, meanwhile, four air cylinders drive clamping blocks to compact outer side of the wheel, and the wheel is completely positioned; at this moment, a bolt hole of the wheel can be drilled; after machining, second servo motor drives right shaft, right lug plate and a turnover part to rotate certain angles via second decelerator; high pressure oil is introduced into cavities between ipsilateral expansion sleeves and end covers, and left and right shafts are separately locked by ipsilateral expansion sleeves.

2 Claims, 3 Drawing Sheets

(51) Int. Cl.
*B23Q 3/06* (2006.01)
*B23B 31/30* (2006.01)

(52) U.S. Cl.
CPC ....... *B23B 2215/08* (2013.01); *B23B 2222/04* (2013.01); *B23B 2270/025* (2013.01); *Y10T 279/10* (2015.01); *Y10T 279/1274* (2015.01); *Y10T 279/19* (2015.01); *Y10T 279/29* (2015.01); *Y10T 279/3487* (2015.01)

(56) References Cited

U.S. PATENT DOCUMENTS

| | | | |
|---|---|---|---|
| 6,687,967 | B1 | 2/2004 | Smith |
| 8,172,489 | B2 * | 5/2012 | Prust ................. B23B 31/16275 269/134 |
| 10,029,314 | B1 * | 7/2018 | Wu ....................... B23B 31/001 |
| 2007/0221337 | A1 * | 9/2007 | Sammartin ............ B23Q 3/062 157/14 |

FOREIGN PATENT DOCUMENTS

| | | | |
|---|---|---|---|
| CN | 202278365 U | 6/2012 | |
| CN | 203557069 U | 4/2014 | |
| CN | 104511765 A | 4/2015 | |
| CN | 104923809 A | 9/2015 | |
| CN | 105149995 A | 12/2015 | |
| CN | 205020734 U | 2/2016 | |
| CN | 205380488 U | 7/2016 | |
| CN | 206382913 U | 8/2017 | |
| DE | 4339754 C1 * | 3/1995 | ............. B23B 41/00 |

* cited by examiner

WHEEL CLAMP

CROSS-REFERENCE TO RELATED APPLICATIONS

This application is filed based upon and claims priority to Chinese Patent Application No. 201710035290.7, filed on Jan. 18, 2017, the entire contents of which are incorporated herein by reference.

TECHNICAL FIELD

The disclosure relates to a clamp, and specifically to a wheel drilling clamp.

BACKGROUND

In the machining production process of an aluminum alloy wheel, a bolt hole and a valve hole need to be drilled in the machining center after an outer rim is turned. A traditional clamp often corresponds to one wheel type during machining due to the influence of the excircle diameter, the central hole diameter, the wheel width and the like parameters, so it is very poor in universality and is not suitable for mixed line machining production. Besides, it takes much time and energy to replace the clamp, thereby seriously influencing the production efficiency. The industry urgently needs a clamp meeting the requirements of mixed-line and automatic volume-produce of mainstream wheel machining enterprises.

SUMMARY

The object of the disclosure is to provide a wheel clamp, which can adapt to drilling machining of wheels having different excircle diameters, central hole diameters and wheel widths in use and is particularly suitable for mixed-line and automatic volume-produce.

In order to achieve the object, the technical solution of the disclosure is a wheel clamp which is composed of an oil cylinder, a bearing seat, a first decelerator, a first servo motor, a turnover platform, a left lug plate, a machine tool platform, a left pedestal, a left shaft, a first left end cover, a support, a rotary joint, a left expansion sleeve, a second left end cover, a lifting plate, end face blocks, a supporting block, a nut, a lead screw, a first protective cover, clamping jaws, a chuck, air-tight devices, a second protective cover, a right lug plate, a right expansion sleeve, a second right end cover, a right shaft, a second decelerator, a first right end cover, a second servo motor, a right pedestal, guide posts, copper sleeves, guide sleeves, air cylinders, a base, clamping blocks and a chuck base.

Both the left pedestal and the right pedestal are fixed on the machine tool platform; the left shaft is installed in a bearing seat on the left pedestal via a bearing, the first left end cover is installed on the left side of the left pedestal, and the second left end cover is installed on the right side of the left pedestal; the rotary joint is installed on the left side of the left shaft; one end of the support is fixed on the left side of the first left end cover, and the other end is connected with the rotary joint; the left expansion sleeve is installed on the second left end cover, and an inner hole of the left expansion sleeve is matched with a section of outer diameter of the left shaft; and the left lug plate is installed on the right side of the left shaft.

The clamping jaws are installed on the chuck, the chuck is installed on the chuck base, and the chuck base is fixed on the turnover platform and arranged in the center of the turnover platform; the oil cylinder is fixed below the turnover platform, and the output end of the oil cylinder is connected with the chuck; the bearing seat is fixed on the turnover platform; the lower end of the lead screw is installed in the bearing seat via the bearing; the first decelerator is fixed below the turnover platform, the output end of the first decelerator is matched with the lower end of the lead screw, and the first servo motor is fixed at the input end of the first decelerator; the supporting block is fixed on the lifting plate, and the nut is matched with the lead screw and installed inside the supporting block; the first protective cover is installed outside the lead screw; the four end face blocks are also fixed on the lifting plate; the two air-tight devices are symmetrically installed on the lifting plate; the second protective cover is installed between the lifting plate and the turnover platform and arranged on four sides of the lifting plate; the four guide posts are fixed below the lifting plate; inner holes of the copper sleeves are matched with the guide posts, and the outer walls of the copper sleeves are in interference fit with the guide sleeves; the four guide sleeves are fixed on the turnover platform; the four air cylinders are fixed on four diagonals of the lifting plate via the base; a clamping block is respectively installed at the output ends of the air cylinders; the left side of the turnover platform is connected with the bottom of the left lug plate; and the right side of the turnover platform is connected with the bottom of the right lug plate.

The second first decelerators installed in a bearing seat on the right pedestal; the second right end cover is installed on the left side of the right pedestal, and the first right end cover is installed on the right side of the right pedestal; the second first servo motors fixed on the right side of the first right end cover, and the output end of the second first servo motors connected with the second decelerator; the right shaft is fixed at the output end of the second decelerator; the right expansion sleeve is installed on the second right end cover, and an inner hole of the right expansion sleeve is matched with the outer diameter of the right shaft; and the right lug plate is installed on the left side of the right shaft.

Inside the left shaft is provided with oil and gas channels, the number of which corresponds to the number of outlets of the rotary joint are formed inside the left shaft, and oil and gas enter from the rotary joint and flow out from the right side and lower part of the left lug plate.

In practical use, a detection system detects the width of a wheel first, the first servo motor drives the lead screw to rotate, the supporting block and the lifting plate are automatically adjusted to appropriate heights via the nut, a manipulator puts the wheel onto the end face blocks, the air-tight devices are pressed down, the oil cylinder drives the chuck so that the clamping jaws expand the central hole of the wheel, meanwhile, the four air cylinders drive the clamping blocks to compact the outer side of the wheel, and the wheel is completely positioned; at this moment, a bolt hole of the wheel can be drilled; after machining, the second servo motor drives the right shaft, the right lug plate and the turnover part to rotate certain angles via the second decelerator; high pressure oil is introduced into the cavity between the left expansion sleeve and the second left end cover and the cavity between the right expansion sleeve and the second right end cover, the left shaft and the right shaft are separately locked by the left expansion sleeve and the right expansion sleeve, and a valve hole can be drilled at this moment.

The wheel clamp of the disclosure can adapt to drilling machining of wheels having different excircle diameters, central hole diameters and wheel widths in use, is particularly suitable for mixed-line and automatic batch machining production, and simultaneously has the characteristics of advanced process, high degree of automation, strong universality, safety and stability.

Figure 1:
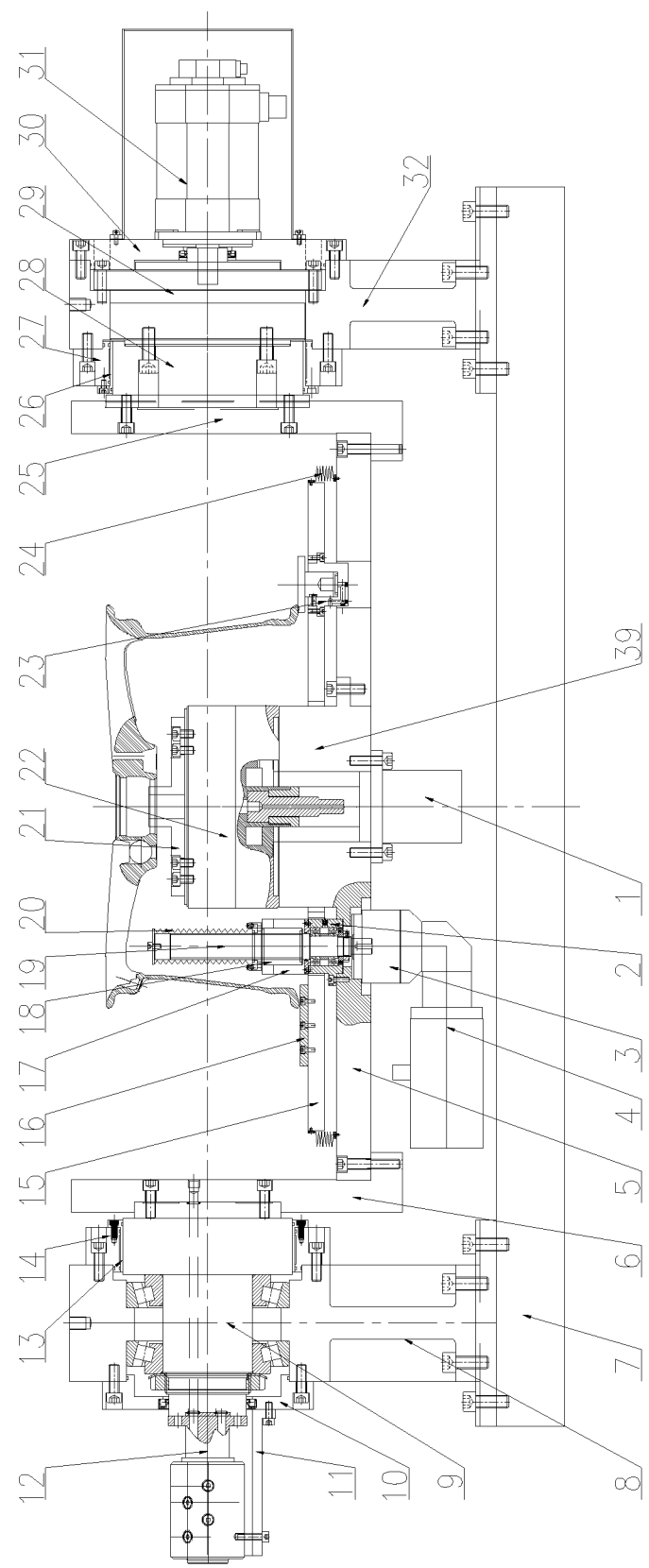
FIG. 1 is a front view of a wheel clamp of the disclosure.
Figure 2:
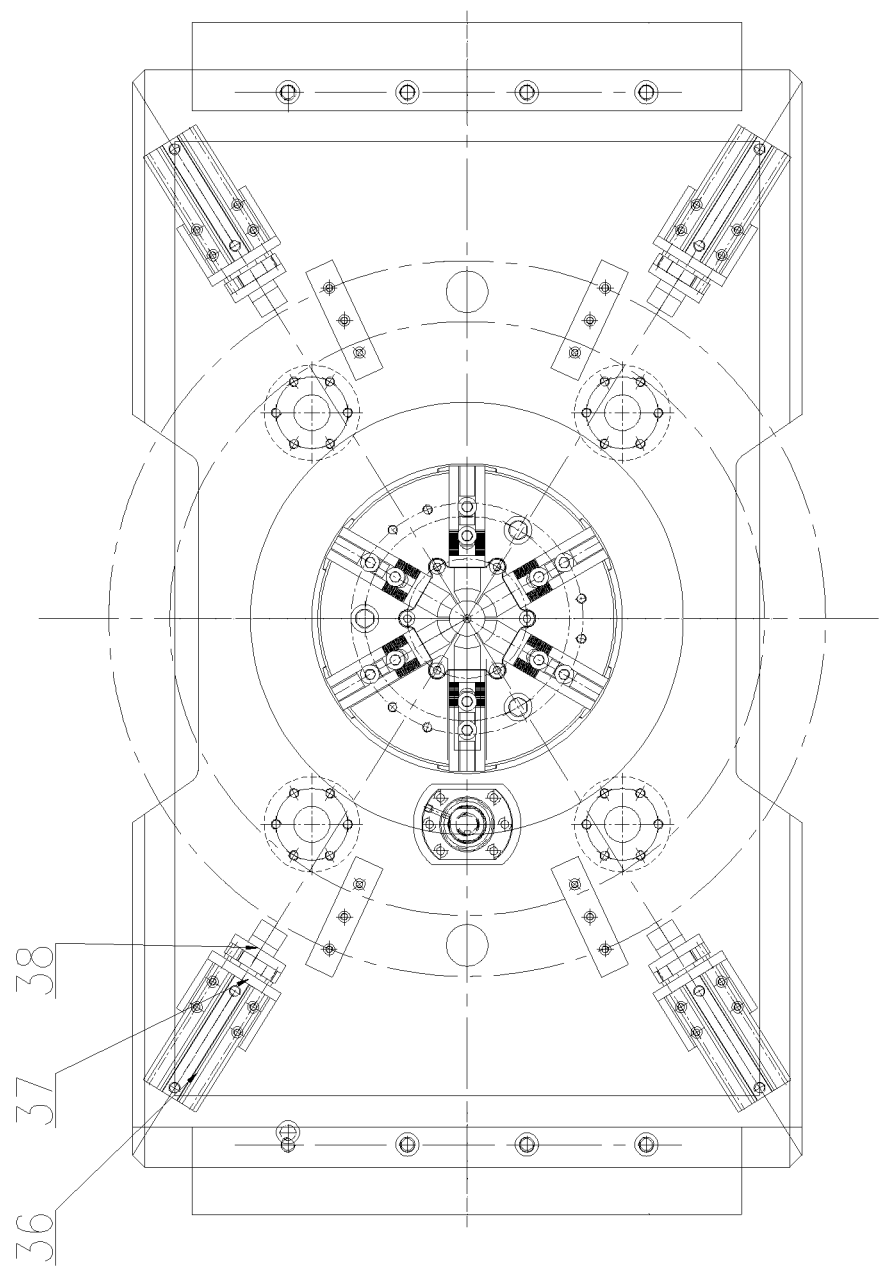
FIG. 2 is a partial top view of the wheel clamp of the disclosure.
Figure 3:
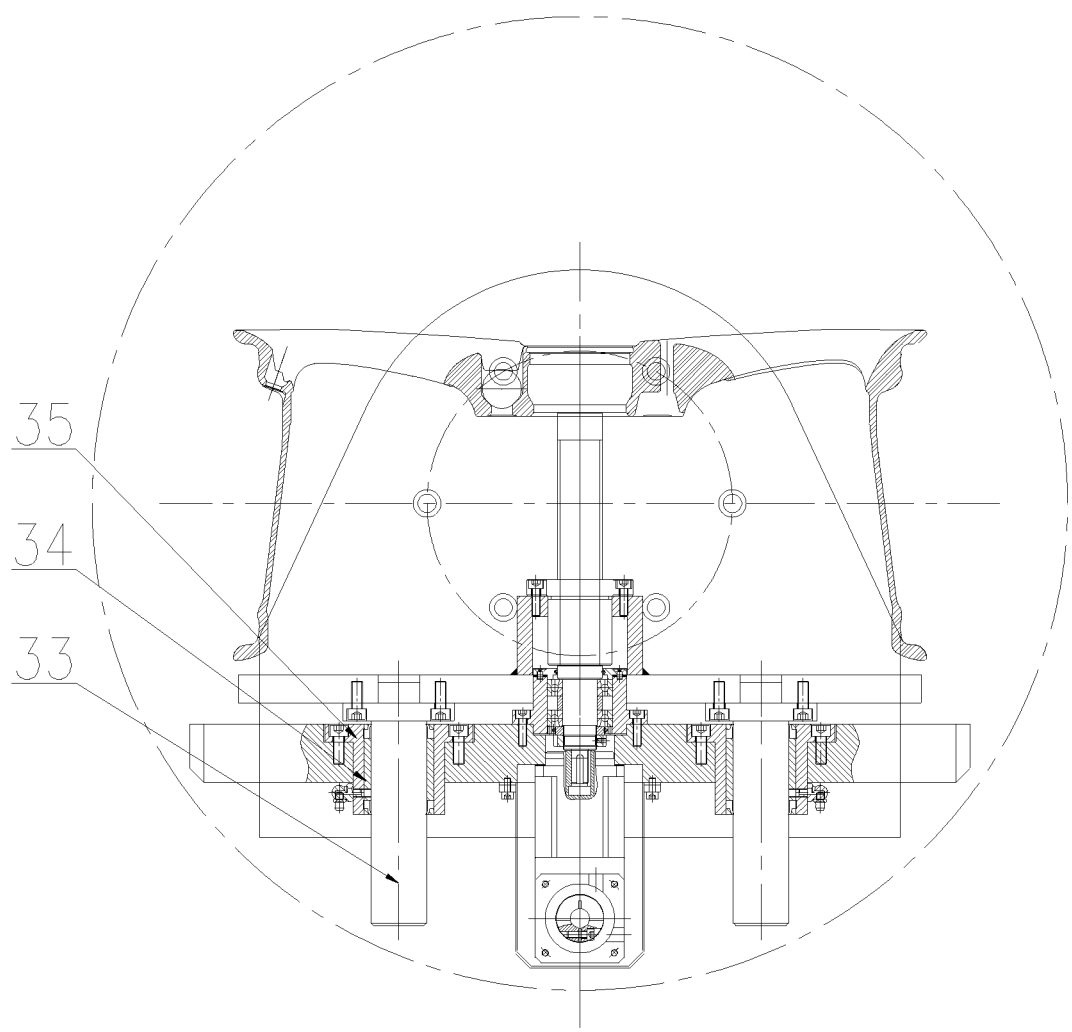
FIG. 3 is a partial left view of the wheel clamp of the disclosure.

LIST OF REFERENCE SYMBOLS 1 oil cylinder
2 bearing seat
3 first decelerator
4 first servo motor
5 turnover platform
6 left lug plate
7 machine tool platform
8 left pedestal
9 left shaft
10 first left end cover
11 support
12 rotary joint
13 left expansion sleeve
14 second left end cover
15 lifting plate
16 end face block
17 supporting block
18 nut
19 lead screw
20 first protective cover
21 clamping jaw
22 chuck
23 air-tight device
24 second protective cover
25 right lug plate
26 right expansion sleeve
27 second right end cover
28 right shaft
29 second decelerator
30 first right end cover
31 second servo motor
32 right pedestal
33 guide post
34 copper sleeve
35 guide sleeve
36 air cylinder
37 base
38 clamping block
39 chuck base

DETAILED DESCRIPTION

Details and working conditions of a specific device provided by the disclosure will be described below in combination with the accompanying drawings.

The device is composed of an oil cylinder 1, a bearing seat 2, a first decelerator 3, a first servo motor 4, a turnover platform 5, a left lug plate 6, a machine tool platform 7, a left pedestal 8, a left shaft 9, a first left end cover 10, a support 11, a rotary joint 12, a left expansion sleeve 13, a second left end cover 14, a lifting plate 15, end face blocks 16, a supporting block 17, a nut 18, a lead screw 19, a first protective cover 20, clamping jaws 21, a chuck 22, air-tight devices 23, a second protective cover 24, a right lug plate 25, a right expansion sleeve 26, a second right end cover 27, a right shaft 28, a second decelerator 29, a first right end cover 30, a second servo motor 31, a right pedestal 32, guide posts 33, copper sleeves 34, guide sleeves 35, air cylinders 36, a base 37, clamping blocks 38 and a chuck base 39.

Both the left pedestal 8 and the right pedestal 32 are fixed on the machine tool platform 7; the left shaft 9 is installed in a bearing seat on the left pedestal 8 via a bearing, the first left end cover 10 is installed on the left side of the left pedestal 8, and the second left end cover 14 is installed on the right side of the left pedestal 8; the rotary joint 12 is installed on the left side of the left shaft 9; one end of the support 11 is fixed on the left side of the first left end cover 10, and the other end is connected with the rotary joint 12; the left expansion sleeve 13 is installed on the second left end cover 14, and an inner hole of the left expansion sleeve 13 is matched with a section of outer diameter of the left shaft 9; and the left lug plate 6 is installed on the right side of the left shaft 9.

A plurality of clamping jaws 21 are installed on the chuck 22, the chuck 22 is installed on the chuck base 39, and the chuck base 39 is fixed on the turnover platform 5 and arranged in the center of the turnover platform 5; the oil cylinder 1 is fixed below the turnover platform 5, and the output end of the oil cylinder 1 is connected with the chuck 22; the bearing seat 2 is fixed on the turnover platform 5; the lower end of the lead screw 19 is installed in the bearing seat 2 via the bearing; the first decelerator 3 is fixed below the turnover platform 5, the output end of the first decelerator 3 is matched with the lower end of the lead screw 19, and the first servo motor 4 is fixed at the input end of the first decelerator 3; the supporting block 17 is fixed on the lifting plate 15, and the nut 18 is matched with the lead screw 19 and installed inside the supporting block 17; the first protective cover 20 is installed outside the lead screw 19; the four end face blocks 16 are also fixed on the lifting plate 15; the two air-tight devices 23 are symmetrically installed on the lifting plate 15; the second protective cover 24 is installed between the lifting plate 15 and the turnover platform 5 and arranged on four sides of the lifting plate 15; the four guide posts 33 are fixed below the lifting plate 15; inner holes of the copper sleeves 34 are matched with the guide posts 33, and the outer walls of the copper sleeves 34 are in interference fit with the guide sleeves 35; the four guide sleeves 35 are fixed on the turnover platform 5; the four air cylinders 36 are fixed on four diagonals of the lifting plate 15 via the base 37; a clamping block 38 is respectively installed at the output ends of the air cylinders 36; the left side of the turnover platform 5 is connected with the bottom of the left lug plate 6; and the right side of the turnover platform 5 is connected with the bottom of the right lug plate 25.

The second decelerator 29 is installed in a bearing seat on the right pedestal 32; the second right end cover 27 is installed on the left side of the right pedestal 32, and the first right end cover 30 is installed on the right side of the right pedestal 32; the second servo motor 31 is fixed on the right side of the first right end cover 30, and the output end of the second servo motor 31 is connected with the second decelerator 29; the right shaft 28 is fixed at the output end of the second decelerator 29; the right expansion sleeve 26 is installed on the second right end cover 27, and an inner hole of the right expansion sleeve 26 is matched with the outer diameter of the right shaft 28; and the right lug plate 25 is installed on the left side of the right shaft 28.

Inside the left shaft 9 is provided with oil and gas channels, the number of which corresponds to the number of outlets of the rotary joint 12, and oil and gas enter from the rotary joint 12 and flow out from the right side and lower part of the left lug plate 6.

In the working process, a detection system detects the width of a wheel first, the first servo motor 4 drives the lead screw 19 to rotate, the supporting block 17 and the lifting plate 15 are automatically adjusted to appropriate heights via the nut 18, a manipulator puts the wheel onto the end face blocks 16, the air-tight devices 23 are pressed down, the oil cylinder 1 drives the chuck 22 so that the clamping jaws 21 expand the central hole of the wheel, meanwhile, the four air cylinders 36 drive the clamping blocks 38 to compact the outer side of the wheel, and the wheel is completely positioned; at this moment, the bolt hole of the wheel can be drilled; after machining, the second servo motor 31 drives the right shaft 28, the right lug plate 25 and the turnover part to rotate certain angles via the second decelerator 29; high pressure oil is introduced into the cavity between the left expansion sleeve 13 and the second left end cover 14 and the cavity between the right expansion sleeve 26 and the second right end cover 27, the left shaft 9 and the right shaft 28 are separately locked by the left expansion sleeve 13 and the right expansion sleeve 26, and the valve hole can be drilled at this moment.

What is claimed is:

1. A wheel clamp, being composed of an oil cylinder, a bearing seat, a first decelerator, a first servo motor, a turnover platform, a left lug plate, a machine tool platform, a left pedestal, a left shaft, a first left end cover, a support, a rotary joint, a left expansion sleeve, a second left end cover, a lifting plate, end face blocks, a supporting block, a nut, a lead screw, a first protective cover, clamping jaws, a chuck, air-tight devices, a second protective cover, a right lug plate, a right expansion sleeve, a second right end cover, a right shaft, a second decelerator, a first right end cover, a second servo motor, a right pedestal, guide posts, copper sleeves, guide sleeves, air cylinders, a base, clamping blocks and a chuck base, wherein both the left pedestal and the right pedestal are fixed on the machine tool platform; the left shaft is installed in a bearing seat on the left pedestal via a bearing, the first left end cover is installed on the left side of the left pedestal, and the second left end cover is installed on the right side of the left pedestal; the rotary joint is installed on the left side of the left shaft; one end of the support is fixed on the left side of the first left end cover, and the other end is connected with the rotary joint; the left expansion sleeve is installed on the second left end cover, and an inner hole of the left expansion sleeve is matched with a section of outer diameter of the left shaft; the left lug plate is installed on the right side of the left shaft;

the clamping jaws are installed on the chuck, the chuck is installed on the chuck base, and the chuck base is fixed on the turnover platform and arranged in the center of the turnover platform; the oil cylinder is fixed below the turnover platform, and the output end of the oil cylinder is connected with the chuck; the bearing seat is fixed on the turnover platform; the lower end of the lead screw is installed in the bearing seat via the bearing; the first decelerator is fixed below the turnover platform, the output end of the first decelerator is matched with the lower end of the lead screw, and the first servo motor is fixed at the input end of the first decelerator; the supporting block is fixed on the lifting plate, and the nut is matched with the lead screw and installed inside the supporting block; the first protective cover is installed outside the lead screw; the four end face blocks are also fixed on the lifting plate; the two air-tight devices are symmetrically installed on the lifting plate; the second protective cover is installed between the lifting plate and the turnover platform and arranged on four sides of the lifting plate; the four guide posts are fixed below the lifting plate; inner holes of the copper sleeves are matched with the guide posts, and the outer walls of the copper sleeves are in interference fit with the guide sleeves; the four guide sleeves are fixed on the turnover platform; the four air cylinders are fixed on four diagonals of the lifting plate via the base; a clamping block is respectively installed at the output ends of the air cylinders; the left side of the turnover platform is connected with the bottom of the left lug plate; the right side of the turnover platform is connected with the bottom of the right lug plate;

the second decelerator is installed in a bearing seat on the right pedestal; the second right end cover is installed on the left side of the right pedestal, and the first right end cover is installed on the right side of the right pedestal; the second servo motor is fixed on the right side of the first right end cover, and the output end of the second servo motor is connected with the second decelerator; the right shaft is fixed at the output end of the second decelerator; the right expansion sleeve is installed on the second right end cover, and an inner hole of the right expansion sleeve is matched with the outer diameter of the right shaft; and the right lug plate is installed on the left side of the right shaft.

2. The wheel clamp of claim 1, wherein inside the left shaft is provided with oil and gas channels, the number of which corresponds to the number of outlets of the rotary joint, and oil and gas enter from the rotary joint and flow out from the right side and lower part of the left lug plate.

\* \* \* \* \*